US011641276B2

(12) United States Patent
Benisty et al.

(10) Patent No.: US 11,641,276 B2
(45) Date of Patent: May 2, 2023

(54) EFFECTIVE KEY MANAGEMENT FOR DATA ENCRYPTION AND DECRYPTION

(71) Applicant: Western Digital Technologies, Inc., San Jose, CA (US)

(72) Inventors: Shay Benisty, Beer Sheva (IL); Amir Segev, Meiter (IL)

(73) Assignee: Western Digital Technologies, Inc., San Jose, CA (US)

(*) Notice: Subject to any disclaimer, the term of this patent is extended or adjusted under 35 U.S.C. 154(b) by 228 days.

(21) Appl. No.: 16/890,973

(22) Filed: Jun. 2, 2020

(65) Prior Publication Data

US 2021/0377017 A1    Dec. 2, 2021

(51) Int. Cl.
| *H04L 9/08* | (2006.01) |
| *G06F 21/78* | (2013.01) |
| *G06F 9/54* | (2006.01) |
| *G06F 16/23* | (2019.01) |
| *G06F 16/17* | (2019.01) |
| *G06F 21/62* | (2013.01) |

(52) U.S. Cl.
CPC ............ *H04L 9/0891* (2013.01); *G06F 9/546* (2013.01); *G06F 16/1734* (2019.01); *G06F 16/23* (2019.01); *G06F 21/6218* (2013.01); *G06F 21/78* (2013.01); *H04L 9/0894* (2013.01)

(58) Field of Classification Search
CPC ..... H04L 9/0891; H04L 9/0894; G06F 9/546; G06F 16/1734; G06F 16/23; G06F 21/6218; G06F 21/78; G06F 21/602
See application file for complete search history.

(56) References Cited

U.S. PATENT DOCUMENTS

| 8,250,376 | B2 * | 8/2012 | Osaki | .................... H04L 9/088 |
| | | | | 711/100 |
| 9,679,165 | B2 * | 6/2017 | Pittelko | .............. H04L 63/0428 |
| 2008/0260159 | A1 * | 10/2008 | Osaki | ................. H04L 63/0464 |
| | | | | 380/277 |
| 2015/0310221 | A1 * | 10/2015 | Lietz | ................... G06F 21/6209 |
| | | | | 713/193 |

* cited by examiner

Primary Examiner — Han Yang
(74) Attorney, Agent, or Firm — Patterson + Sheridan, LLP; Steven H. VerSteeg

(57) ABSTRACT

The present disclosure generally relates to effective key management by properly matching keys used for encryption to data that needs to be decrypted after receiving instructions to change or delete keys. By matching the actual key, rather than just a key index, to a command, each command will use the correct key throughout the entire life-span of the command, even if the key is switched or deleted prior to servicing the command. To implement the key management, a snapshot of the doorbell database is taken. All pending commands that are in the snapshot are then fetched prior to updating a key database with either the change or deletion of the key. After fetching of all pending commands from the snapshot and ensuring the keys are stored in a command context, the key database is updated.

18 Claims, 6 Drawing Sheets

EFFECTIVE KEY MANAGEMENT FOR DATA ENCRYPTION AND DECRYPTION

BACKGROUND OF THE DISCLOSURE

Field of the Disclosure

Embodiments of the present disclosure generally relate to key matching for encryption and decryption.

Description of the Related Art

For secure data storage, the main requirement is protecting the user data, which can require encryption and decryption. Recent developments in the NVMe standard allow the host device to select either: an encryption/decryption key for every IO command (KPIO—Key Per IO), or a key per namespace. The host device is responsible for providing the keys in advance and selecting between the keys in the command based scheme. Alternatively, in a namespace based scheme, the data storage device auto selects the key. In both schemes, the data storage device needs to store a list of all supported keys.

The host device can load more keys, remove keys, and update keys as required. Removing keys is important, especially when the key database is full. The NVMe standard defines that key management is done by administrative commands (i.e., a different thread than the IO commands), where key selecting is done directly in the command.

When the host device changes or removes a key before a command is executed, the data storage device will provide garbled data. For example, a first part of the command may be properly decrypted before the key was switched or was deleted, but the remaining part of the command from after the key switching or deletion will not be decrypted properly and thus, the host device receives the wrong data.

Therefore, there is a need in the art for effective key management.

SUMMARY OF THE DISCLOSURE

The present disclosure generally relates to effective key management by properly matching keys used for encryption to data that needs to be decrypted after receiving instructions to change or delete keys. By matching the actual key, rather than just a key index, to a command, each command will use the correct key throughout the entire life-span of the command, even if the key is switched or deleted prior to servicing the command. To implement the key management, a snapshot of the doorbell database is taken. All pending commands that are in the snapshot are then fetched prior to updating a key database with either the change or deletion of the key. After fetching of all pending commands from the snapshot and ensuring the keys are stored in a command context, the key database is updated.

In one embodiment, a data storage device comprises: a memory device; and a controller coupled to the memory device, wherein the controller is configured to: receive a key for encryption/decryption from a secured command context, wherein the secured command context is distinct from a key storage; decrypt or encrypt data using the key; and deliver the data to a host device.

In another embodiment, a data storage device comprises: a memory device; and a controller coupled to the memory device, wherein the controller comprises a control path portion, a data path portion, and an admin key management portion, wherein the controller is configured to perform the following in the admin key management portion: receive a request to change a key in a key database; fetch all commands for which a doorbell has been rung; and update the key database after fetching all commands for which the doorbell has been rung.

In another embodiment, a data storage device comprises: a memory device; a controller coupled to the memory device; means to receive a key change request from a host device; and means to fetch all commands for which a doorbell has been rung prior changing a key as instructed by a host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to effective key management by properly matching keys used for encryption to data that needs to be decrypted after receiving instructions to change or delete keys. By matching the actual key, rather than just a key index, to a command, each command will use the correct key throughout the entire life-span of the command, even if the key is switched or deleted prior to servicing the command. To implement the key management, a snapshot of the doorbell database is taken. All pending commands that are in the snapshot are then fetched prior to updating a key database with either the change or deletion of the key. After fetching of all pending commands from the snapshot and ensuring the keys are stored in a command context, the key database is updated.

Figure 1:
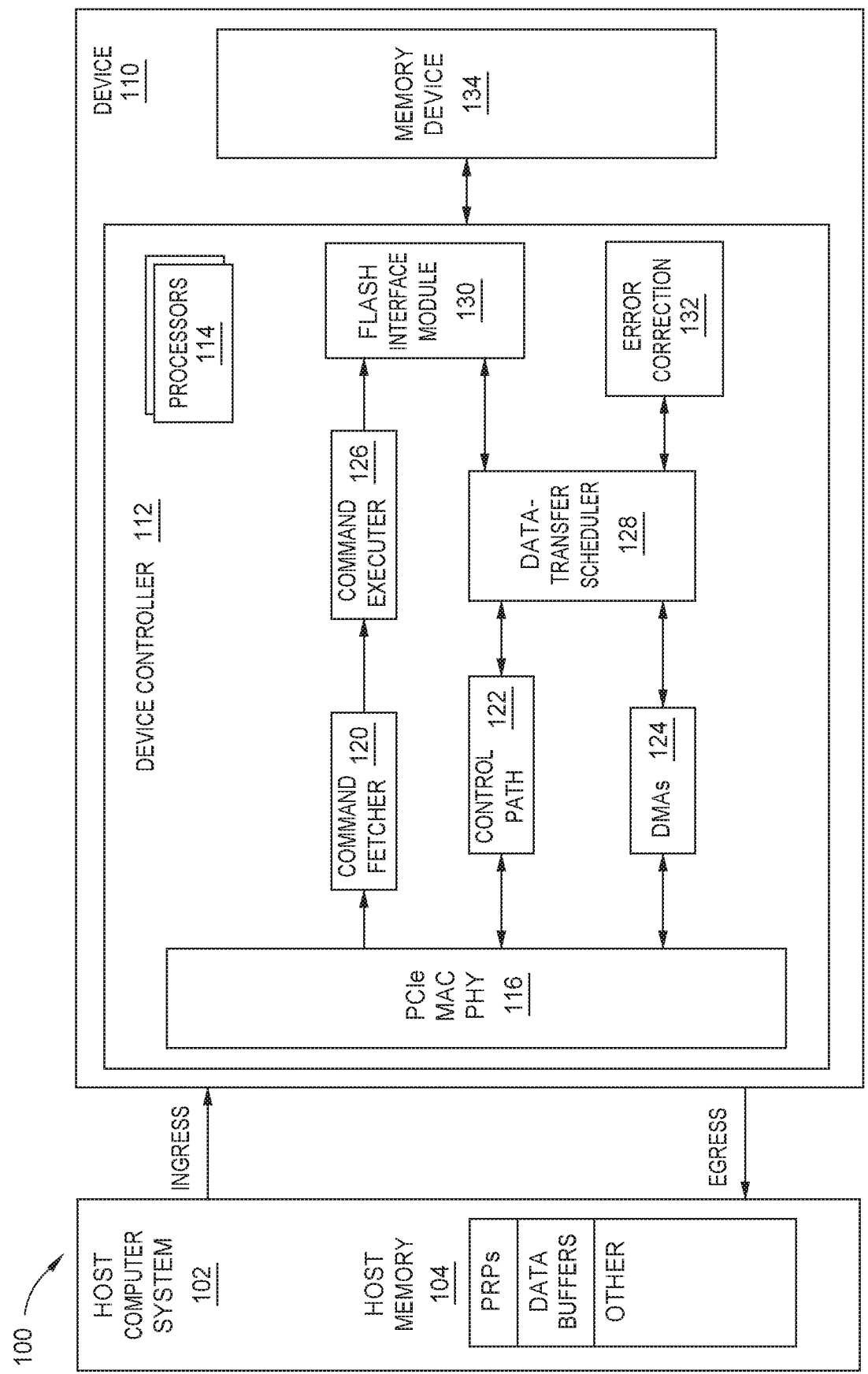
FIG. 1 is a schematic block diagram illustrating a storage system according to one embodiment.

FIG. 1 is a schematic block diagram illustrating a storage system 100 according to one embodiment. The host 102 may utilize a memory device 134, such as a non-volatile memory (NVM), included in data storage device 110 to store and retrieve data effectively. Host 102 comprises a host memory 104 and an interface (not shown). Host 102 may include a wide range of devices, such as computer servers, network attached storage (NAS) units, desktop computers, notebook (e.g., laptops) computers, tablet computers (e.g., "smart" pads), mobile devices, set-top boxes, telephone handsets (e.g., "smart" phones), televisions, cameras, display devices, digital media players, video gaming consoles, video streaming devices, automotive applications (e.g., mapping, autonomous driving), or other devices capable of running one or more virtualized hosts. In certain embodiments, host 102 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware. Host memory 104 is a device allowing information, such as executable instructions, cryptographic keys, configurations, and other data, to be stored and retrieved. Host memory 104 can be DRAM, virtual memory, other main memories, and combinations thereof. The host memory 104 comprises parallel redundancy protocols, data buffers, and other components.

The interface can be a network interface or a data storage device interface. Network interface enables host 102 to communicate with data storage device 110 via a communication medium. Network interface may be one or more network adapters, also referred to as Network Interface Cards (NICs). Data storage device interface enables host 102 to communicate with data storage device 110 via a dedicated link.

The host 102 interface interacts with a data storage device 110 interface for ingress and egress of communications between host 102 and data storage device 110. Data storage device 110 interface and host 102 interface operate under a communication protocol, such as a Peripheral Component Interface Express (PCIe) serial communication protocol or other suitable communication protocols. The interface includes one or more ports, such as a PCIe port, an RDMA port (Ethernet, RoCE/iWARP, InfiniBand), a fibre channel port, a TCP port, or other suitable fabric ports. Devices connected to the PCIe fabric direct communications to other devices by providing a PCIe address. The fabric routes such communications to the appropriate device based on the PCIe address. One portion of the address is a device number that specifies the physical device to which a communication is to be routed.

Host 102 and data storage device 110 can communicate over the PCIe interface through NVMe communications. NVMe communications can be by one or more of NVMe over PCIe fabrics, NVMe over non-PCIe fabrics, and/or local PCIe. NVMe over non-PCIe fabrics includes a transport abstraction layers at both sides of the fabric interfaces to translate native PCIe transactions over non-PCIe fabrics. Host 102 can be connected to the data storage device 110 over a data center storage system network, an enterprise storage system network, a storage area network, a cloud storage network, a local area network (LAN), a wide area network (WAN), the Internet, other networks, wired links, wireless links, and interconnections thereof.

Data storage device 110 may be a network storage device, an internal storage drive (e.g., server computer, desktop hard drive, notebook computer), a data center storage device, an external storage device, an embedded mass storage device, a removable mass storage device, and other suitable data storage devices.

Data storage device 110 includes a storage device controller 112 which manages operations of data storage device 110, such as writes to and reads from a zoned namespace of a NVM 134 comprising ZNS protocol. The term NVM used herein may refer to the NS-A individually or to the one or more non-volatile memory units within the data storage device 110 for exemplary purposes. Each namespace comprises one or more zones, such as Zone 0 and Zone 1. Storage device controller 112 may include one or more processors 114, which may be multi-core processors. Processor 114 handles the components of data storage device 110 through firmware and/or software. Processor 114 executes instructions of the computer-readable program code of the firmware and/or software. Storage device controller 112 implements the processes described herein by execution of instructions by the processor 114, by hardware, or by combinations thereof. Hardware can include various components of storage device controller 712, such as logic gates, switches, application specific integrated circuits (ASICs), programmable logic controllers, embedded microcontrollers, registers, and other components.

Storage device controller 112 may operate under the NVMe protocol, but other protocols are applicable. The NVMe protocol is a communications interface/protocol developed for SSDs to operate over a host and storage device linked over a PCIe interface. NVMe protocol provides a command queue and completion path for access of data stored in data storage device 710 by host 102.

The NVM 134 of data storage device 110 may be configured for long-term storage of information as non-volatile memory space and retains information after power on/off cycles. NVM 134 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in data storage device 110. Each platter may contain one or more regions of one or more tracks of data. NVM 134 may include one or more types of non-volatile memory.

Data storage device 110 may also include other components, such as a flash interface module 130, an error correction module 732, a command fetcher 120, a command executor 126, and a control path 122. The storage device controller 112 may utilize the flash interface module 130 to interact with NVM 134 for read and write operations. DMA module 124 executes data transfers between host 102 and data storage device 110 without involvement from a host 102 CPU. Data transfer scheduler 128 controls the data transfer while activating the control path for fetching physical page regions (PRPs), posting completion and interrupts, and activating the DMAs for the actual data transfer between host 102 and data storage device 110. Error correction module 132 corrects the data fetched from the memory arrays. Command fetcher 120 parses commands to command executor 126 for execution on flash interface module 130.

Figure 2:
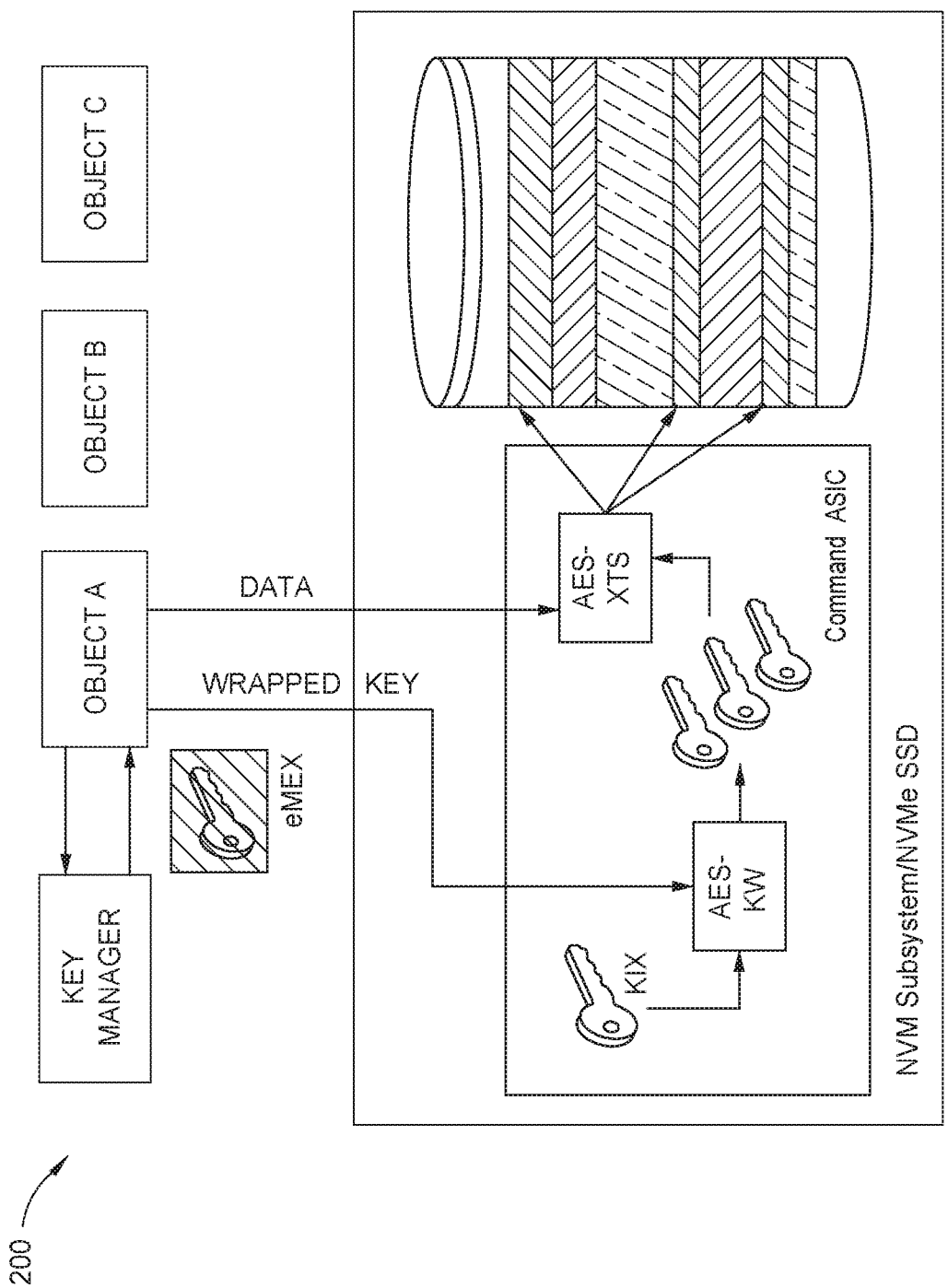
FIG. 2 is a schematic illustration of KPIO according to one embodiment.

FIG. 2 is a schematic illustration of KPIO according to one embodiment. As noted above, for each command or namespace, the host can specify a key for encrypting and decrypting. The host determines which key is applicable to which command or namespace. As shown in FIG. 2, the host device has a key manager and several objects labeled Object A-Object C. Objects A-C represent either different commands or different namespaces, dependent upon the desired scheme noted above. The host provides the key to the data storage device separate from the data. The keys are stored in the data storage device separate from the data. The encrypted data is stored in the memory device of the data storage device. The encrypted data includes an indication of the specific key for encrypting and decrypting.

The host can load more keys, remove keys, and update keys as desired. Removing keys is important especially when the key database is full. The NVMe standard defines that key management is done by admin commands (a different thread than the IO commands), whereas key selection is done directly in the command.

The keys are used by the data storage device to encrypt and decrypt any IO command sent by the host. The AES-XTS is on the device side on the media controller ASIC. The AES-XTS is the encryption and decryption algorithm. FIG. 2 gives an example using Object A. Object A includes an indication of the key. The data storage device takes the data and, based upon the key, encrypts the data and write the data to memory. Object B and Object C will operate as Object A in the example given above.

Figure 3A:
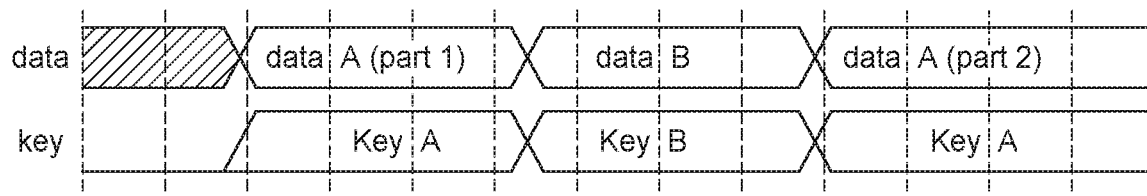
FIGS. 3A-3C are schematic illustrations of data-key behavior according to various embodiments.
Figure 3B:
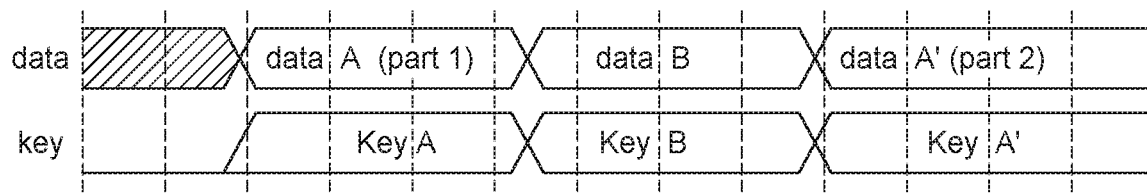
Figure 3C:
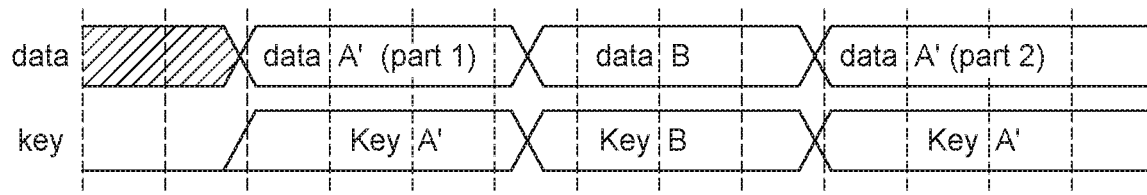

FIGS. 3A-3C are schematic illustrations of data-key behavior according to various embodiments. FIG. 3A demonstrates, through an example, how keys are used throughout the service of an IO read command. The same example can be used for an IO write. In FIG. 3A, part 1 of data A is serviced with Key A, followed by data B serviced with Key B, then part 2 of data A with Key A again. The data is properly decrypted for both data A and data B because the key properly matches the data.

FIGS. 3B and 3C show two problems that can occur due to key switching. FIG. 3B shows an example where the key is changed in the middle of a command. As shown in FIG. 3B the data for command A comes out garbled, as the data is partially decrypted by Key A, and partially by Key A'. As a result, the host receives incorrect data. FIG. 3C shows an example where the key is changed prior to completing the command. As shown in FIG. 3C the data for command A comes out garbled, as data A' is decrypted by the incorrect key, Key A' rather than Key A. As a result, the host receives wrong data.

Figure 4:
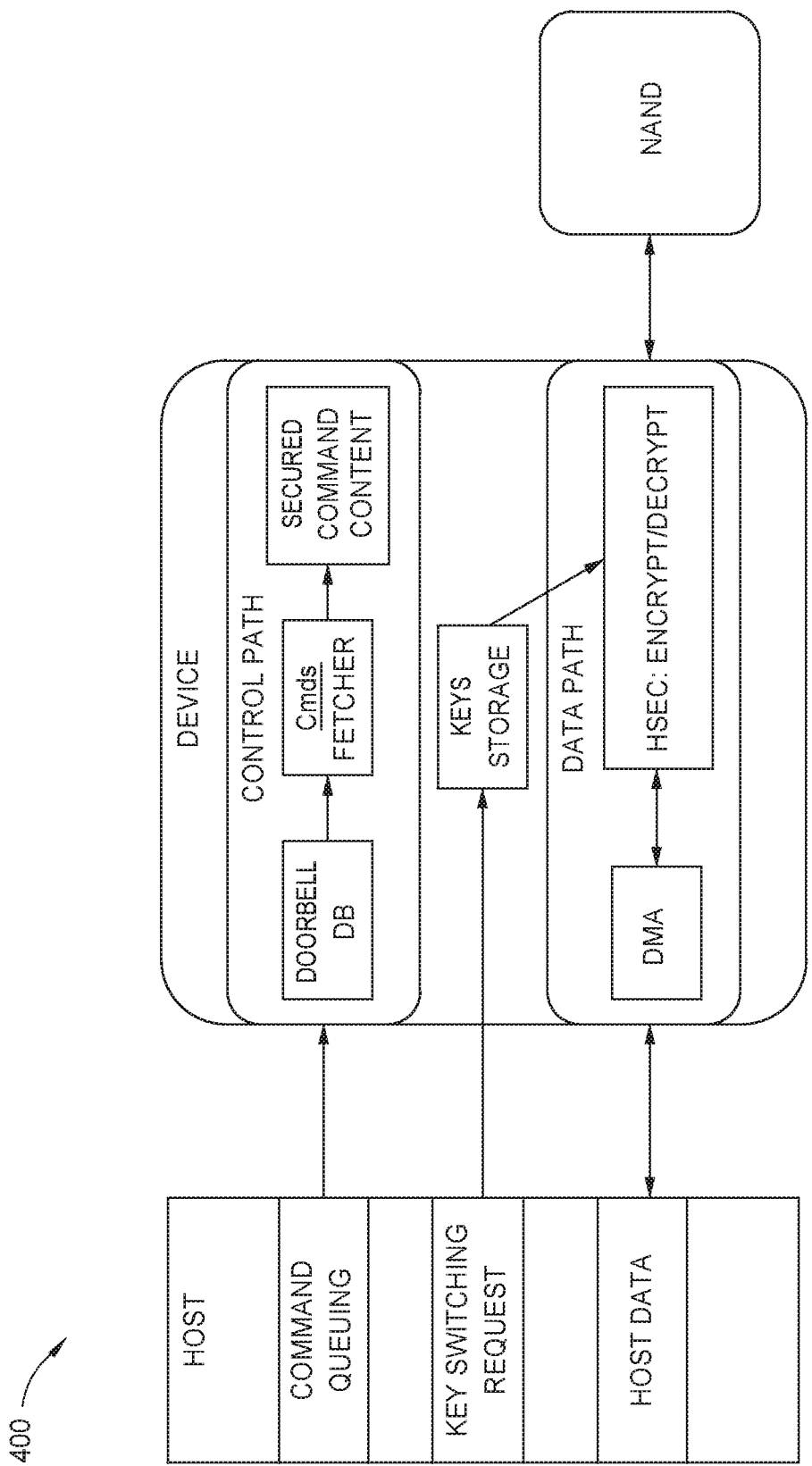
FIG. 4 is a schematic illustration of key management.

FIG. 4 is a schematic illustration of key management. As shown in FIG. 4, the host device is responsible for switching the keys in the correct timing, which adds extra complexity in the host side by having synchronization between the administrative and input/output paths. There are two main drawbacks in the approach illustrated in FIG. 4, complexity and performance degradation. As shown in FIG. 4 (by the arrow from keys storage to data path), the key is taken directly from storage when the key is required for the encryption/decryption process. There are two straightforward solutions that could be implemented in the device, but both approaches have disadvantages in performance.

The first solution is to stop fetching new commands and do not start servicing already-fetched new commands. Finish servicing all pending commands, then change the key, and then enable both fetching and servicing new commands. Performance is greatly impacted due to stopping of all the data flow pipes.

The second solution is to stop servicing new commands that require the use of the key index whose key is about to be switched. Finish all commands using that key index that already started, and only then do the key switch. A counter of "how many commands per key index" is required for this implementation. Once the counter is 0, the key switch can take place, and new commands directed to that key index can occur. The performance is impacted as some commands are not serviced to allow the counter to reach 0.

Figure 5:
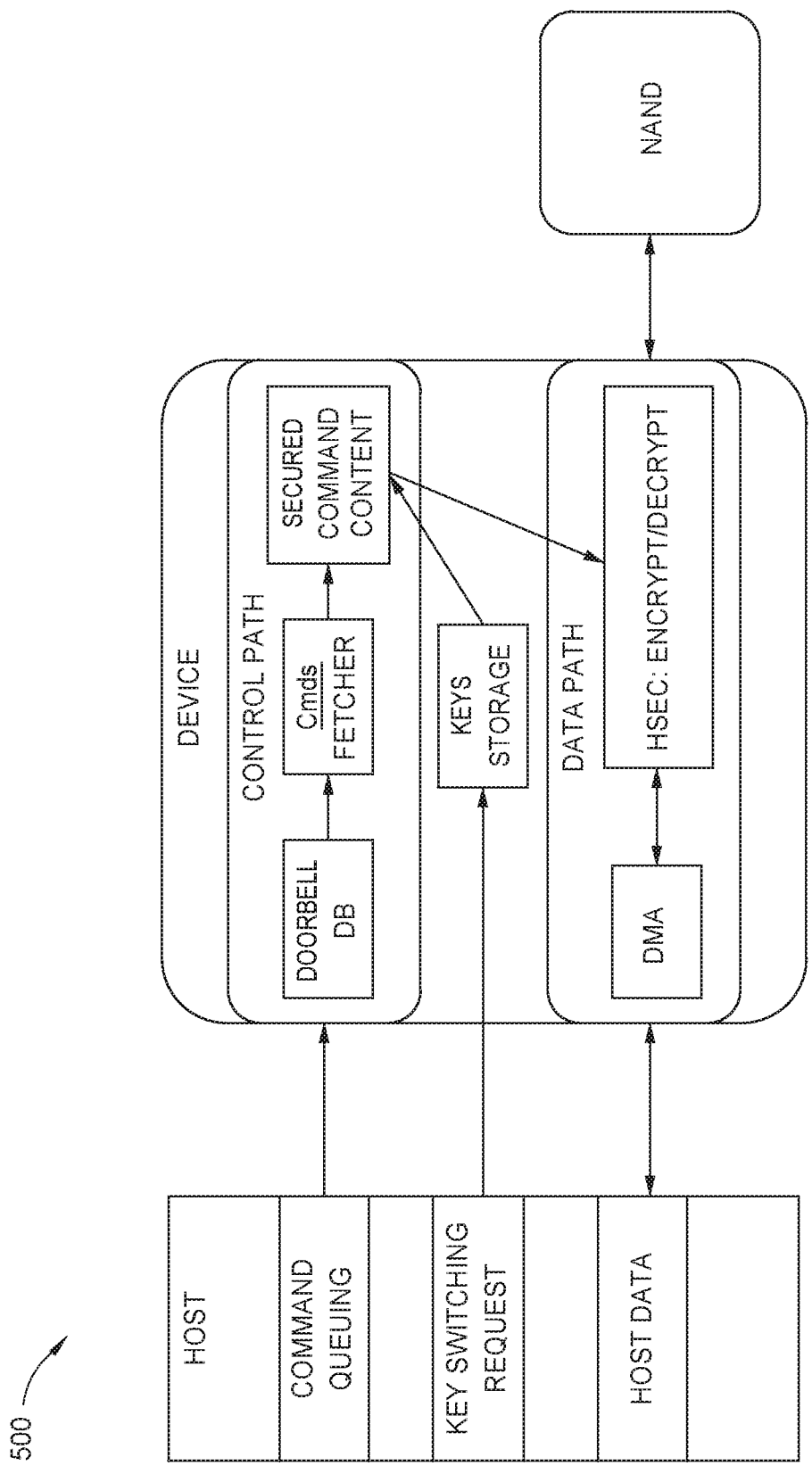
FIG. 5 is a schematic illustration of key management according to one embodiment.

FIG. 5 is a schematic illustration of key management according to one embodiment. As shown in FIG. 5, matching the actual key, instead of just a key index, to the command upon fetching form host is shown. Matching the actual key will ensure that each command is using the correct key throughout the entire life-span of the command, even if the key is switched before the command is serviced. To avoid a racing condition, the key switching should take place when all previously queued input/output commands have been mapped to use the original queue.

As shown in FIG. 5, the host command queuing informs the device about the existence of new commands through a doorbell (DB) mechanism. The DB is the mapping of all commands queued by the host. The command fetcher is responsible for fetching a command and extracting the relevant key index. The command fetcher will update the secured command-context with the actual key, and not the key index. The secured command context holds the key used by the command. The key storage is used as the source for copying keys to secured-command-context, and gives the admin flow a way to handle the keys. In the data path, for read commands the host security module security engine (HSEC) receives the data from the NAND, uses the key from secured-command-context, and passes decrypted data to the DMA towards the host. The opposite direction is valid for write commands.

Figure 6:
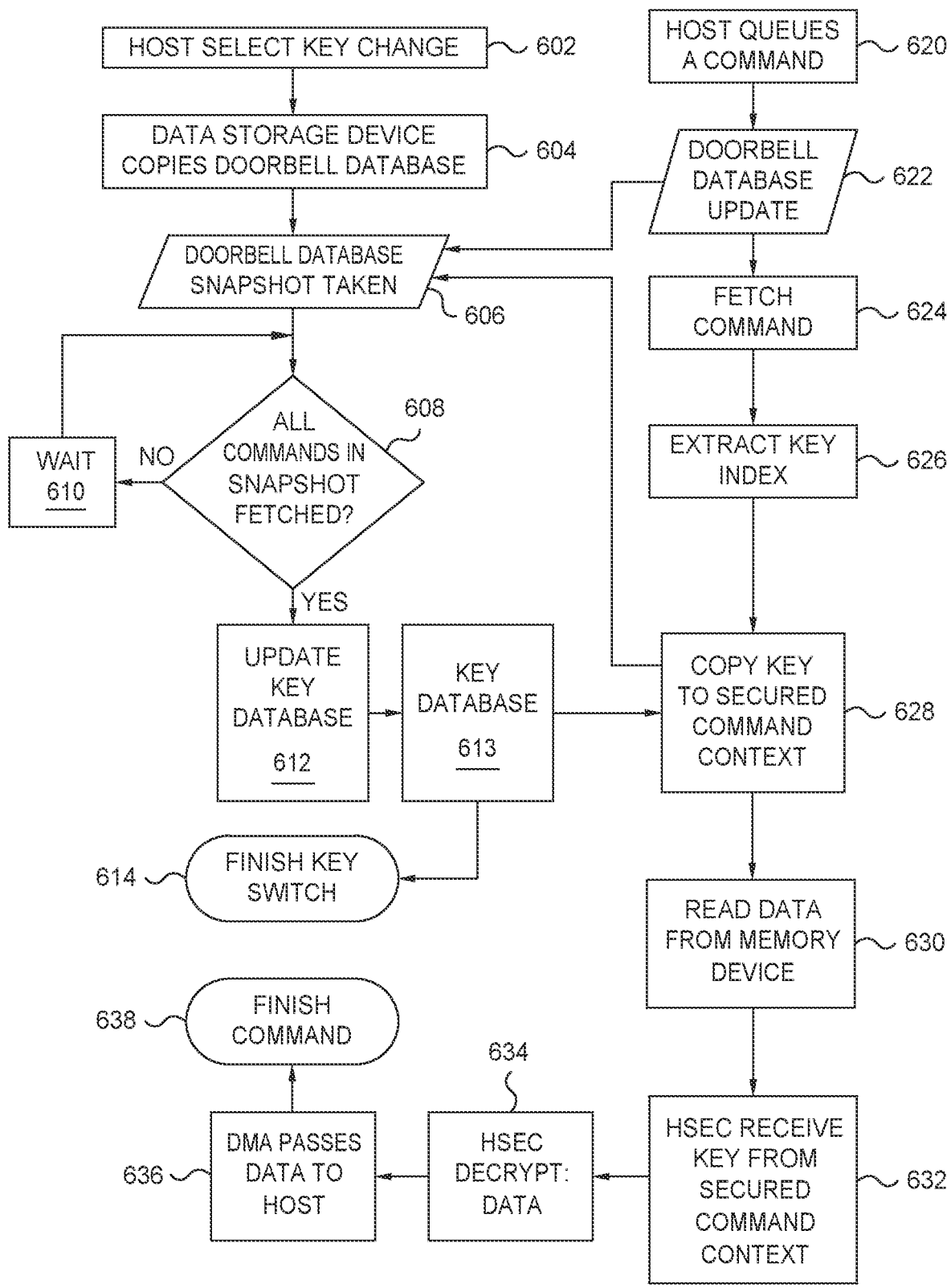
FIG. 6 is flowchart illustrating a method of key management according to one embodiment.

FIG. 6 is flowchart illustrating a method of key management according to one embodiment. At block 602, the host device instructs the data storage device to change the key. Then, at block 604, the data storage device copies the doorbell database, and a doorbell snapshot is taken at block 606. The data storage device then determines whether all commands in the snapshot have been fetched at block 608. If all of the commands in the doorbell snapshot have not been fetched, then the data storage device waits at block 610. Once all commands in the DB snapshot have been fetched in block 608, the key database is updated in block 612 resulting in an updated/new key database in block 613. Finally, the key switch occurs in block 612. Blocks 604, 606, 608, 610, 612, and 613 are all part of the data storage device administrative key management.

In parallel to the administrative key management, commands are processed. Specifically, the host device queues a command in block 620. The doorbell database is updated in block 622 with the queued command. This updated doorbell database in block 622 is the doorbell database containing all of the commands that have been queued for which the doorbell snapshot is taken in block 606. Thereafter, in block 624, commands that have been queued are fetched. The key index is then extracted in block 626, and the key is copied to the secured-command-context in block 628. The key copied in block 628 is used to update the doorbell snapshot taken in block 606. Additionally, the updated key database from block 613 is what is used for copying the key in block 628. Blocks 622, 624, 626, and 628 are all part of the data storage device control path.

Thereafter, data can be read from the memory device in block 630. The HSCE then receives the key from the secured-command-context in block 632, the HSCE then decrypts the data in block 634, and the DMA passes the requested, now decrypted data, to the host in block 636 to finish command processing in block 638. Blocks 630, 632, 634, and 636 are all part of the data storage device data path.

It is important to note that the host device can continue to queue commands during the key switching. Also, the key change (or deletion) request will remain pending until all queued commands have been fetched (and their key is updated in the secure command context). The key change (or deletion) request is pending until there are no commands being executed that use the pre-changed (or pre-deleted) key. Any new commands queued by the host will not affect the pending status of the key switch command.

In one embodiment, a data storage device comprises: a memory device; and a controller coupled to the memory device, wherein the controller is configured to: receive a key for encryption/decryption from a secured command context, wherein the secured command context is distinct from a key storage; decrypt or encrypt data using the key; and deliver the data to a host device. The controller is further configured to: receive a notification that a host device has placed a command in a command queue; update a doorbell database; and fetch the command from the command queue. The controller is further configured to: extract a key index; copy a key pointed to by the key index to a secured command context; and read data corresponding to the command from the memory device. The controller is further configured to: receive an indication from the host device to change a key; copy a doorbell database for updating; and take a snapshot of the doorbell. The controller is further configured to fetch all commands listed in the snapshot of the doorbell prior to updating a key database, ensure copies of keys from the key storage are stored in the secured command context, and change the key. The controller is further configured to copy the key pointed to by a key index to a secured command context. The controller is further configured to update the doorbell snapshot. The controller is further configured to update a doorbell database.

In another embodiment, a data storage device comprises: a memory device; and a controller coupled to the memory device, wherein the controller comprises a control path portion, a data path portion, and an admin key management portion, wherein the controller is configured to perform the following in the admin key management portion: receive a request to change a key in a key database; fetch all commands for which a doorbell has been rung; and update the key database after fetching all commands for which the doorbell has been rung. The controller is further configured to perform the following in the admin key management portion: deliver the updated key database to the control path portion. The controller is further configured to perform the following in the admin key management portion: take a snapshot of the doorbell. The controller is further configured to perform the following in the control path portion: copy the key pointed to by a key index to a secured command context. The controller is further configured to update the doorbell snapshot in the admin key management portion based upon copying the key pointed to by the key index to the secured command context. The controller is further configured to update a doorbell database in the control path portion based upon the updated doorbell snapshot from the admin key management portion. The controller is further configured to perform the following in the data path portion: decrypt data or encrypt data.

In another embodiment, a data storage device comprises: a memory device; a controller coupled to the memory device; means to receive a key change request from a host device; and means to fetch all commands for which a doorbell has been rung prior changing a key as instructed by a host device. The data storage device further comprising means to take a doorbell snapshot. The data storage device further comprising means to update the doorbell snapshot. The data storage device further comprising means to update a doorbell database based upon the means to update the doorbell snapshot. The data storage device further comprising means to store a key in a control path portion of the controller, wherein the means to store a key in a control path portion of the controller is distinct from a key storage location within the data storage device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   receive a key for encryption/decryption from a secured command context of the controller, wherein the secured command context is distinct from a key storage of the controller;
   receive an indication from a host device to change the key stored in the key storage;
   copy a doorbell database for updating, wherein the doorbell database comprises mappings of commands queued by the host device, and wherein a doorbell indicates to the controller that new commands are queued by the host device;
   take a snapshot of the doorbell database;
   fetch all commands listed in the snapshot of the doorbell database prior to updating a key database, wherein the key database stores key indexes, and wherein each key index points to a respective key stored in the key storage;
   ensure copies of keys from the key storage are stored in the secured command context;
   change the key in the key storage in response to the ensuring;
   decrypt or encrypt data stored in the memory device using the key stored in the secured command context prior to updating the key database; and
   deliver the encrypted/decrypted data to the host device.

2. The data storage device of claim 1, wherein the controller is further configured to:
   receive a notification that the host device has placed a command in a command queue;
   update the doorbell database; and
   fetch the command from the command queue.

3. The data storage device of claim 2, wherein the controller is further configured to:
   extract a key index corresponding to the key from the key database;
   copy the key pointed to by the key index to the secured command context; and read data corresponding to the command from the memory device.

4. The data storage device of claim 1, wherein the controller is further configured to copy the key, stored in the key storage prior to changing the key, pointed to by the key index of the key database to the secured command context.

5. The data storage device of claim 4, wherein the controller is further configured to update the doorbell database snapshot.

6. The data storage device of claim 1, wherein the controller is further configured to update the doorbell database, wherein the doorbell database comprises mappings of commands queued by the host device.

7. A data storage device, comprising:
a memory device; and
a controller coupled to the memory device, wherein the controller comprises a control path portion, a data path portion, and an admin key management portion, wherein the controller is configured to perform the following in the admin key management portion:
receive a request to change a key in a key storage;
fetch all commands for which a doorbell has been rung, wherein the doorbell comprises a doorbell database comprising a mapping of commands queued by a host device, wherein fetching further comprises copying keys corresponding to all the commands for which the doorbell has been rung to the control path portion prior to changing the keys in the key storage, and wherein the doorbell indicates to the controller that new commands are queued by the host device;
update a key database storing key indexes corresponding to keys stored in the key storage after fetching all commands for which the doorbell has been rung; and
utilize the keys stored in the control path portion to decrypt or encrypt data associated with all the commands fetched for which the doorbell has been rung.

8. The data storage device of claim 7, wherein the controller is further configured to perform the following in the admin key management portion: deliver the updated key database to the control path portion.

9. The data storage device of claim 8, wherein the controller is further configured to perform the following in the admin key management portion: take a snapshot of the doorbell database.

10. The data storage device of claim 9, wherein the controller is further configured to perform the following in the control path portion: copy the key pointed to by a key index to a secured command context.

11. The data storage device of claim 10, wherein the controller is further configured to update the doorbell database snapshot in the admin key management portion based upon copying the key pointed to by the key index to the secured command context.

12. The data storage device of claim 11, wherein the controller is further configured to update the doorbell database in the control path portion based upon the updated doorbell snapshot from the admin key management portion.

13. The data storage device of claim 7, wherein the controller is further configured to perform the following in the data path portion: decrypt data, or encrypt data.

14. A data storage device, comprising:
a memory device;
a controller coupled to the memory device;
means to receive a key change request from a host device;
means to fetch all commands for which a doorbell has been rung prior to changing a key as instructed by the host device, wherein the doorbell indicates to the controller that new commands are queued by the host device, and wherein the means to fetch all commands further comprises means to copy keys corresponding to all the commands for which the doorbell has been rung to a secured command context prior to changing the keys in a key storage;
means to copy a doorbell database for updating, wherein the doorbell database comprises mappings of commands queued by the host device;
means to change the key in the key storage; and
means to utilize the keys stored in the secured command context to decrypt or encrypt data associated with all the commands fetched for which the doorbell has been rung prior to changing the key as instructed by the host device.

15. The data storage device of claim 14, further comprising means to take a snapshot of the doorbell database.

16. The data storage device of claim 15, further comprising means to update the doorbell database snapshot.

17. The data storage device of claim 16, further comprising means to update the doorbell database based upon the means to update the doorbell database snapshot.

18. The data storage device of claim 14, further comprising means to store a key in a control path portion of the controller, wherein the means to store the key in the control path portion of the controller is distinct from a key storage location within the data storage device.

* * * * *